2,496,213

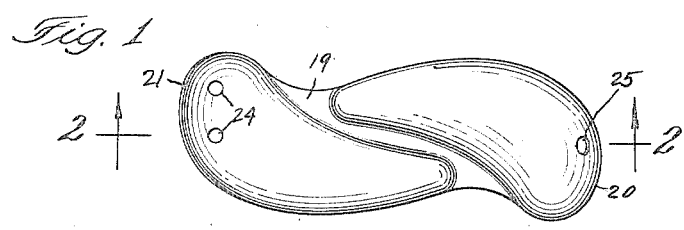
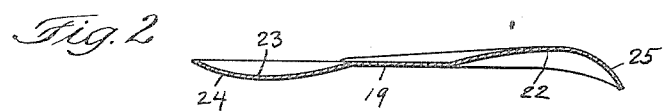
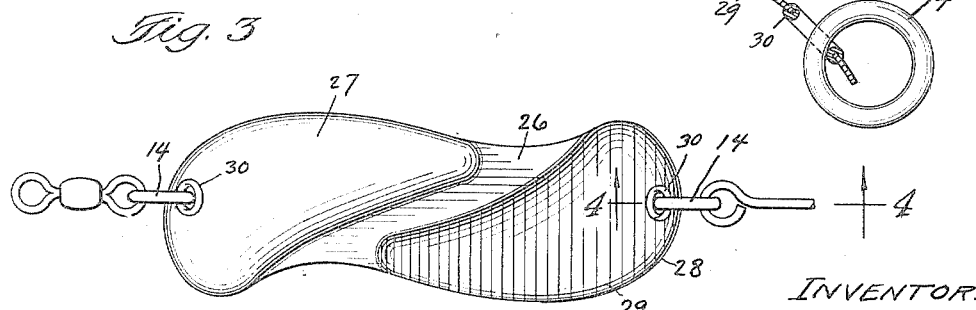
INVENTORS
WILSON C. HUNTLEY
KENNETH S. WRIGHT
ATTORNEY Patented Jan. 31, 1950

UNITED STATES PATENT OFFICE 2,496,213

FISHING LURE

Wilson C. Huntley and Kenneth S. Wright, Portland, Oreg.

Application June 7, 1946, Serial No. 675,106

2 Claims. (Cl. 43—42.51)

This invention relates generally to fishing tackle and particularly to a fishing lure.

The main object of this invention is to provide a lure whose action in the water is varied by the speed at which it is moved.

The second object is to produce a lure which will wabble at a very low trolling speed, and will wabble and dive at another speed, and will wabble and spin at a higher speed, thereby making a lure which can be used in a wide range of trolling speeds.

The third object is to construct a lure in a manner to afford protection for certain areas of the lure.

The fourth object is to so construct the lure that its action may be selectively controlled by the manner of attaching same to the tackle.

The fifth object is to construct a lure which will spin at lower speeds than does the conventional lure of a corresponding type.

The sixth object is to construct a lure having a plurality of holes formed along the end thereof, whereby the point of coupling may be varied for the purpose of controlling the action of the lure.

The seventh object is the construction of the wabbler in a manner that a light weight and relatively soft material can be employed without danger of cutting through the lure at the fastening openings.

We accomplish these and other objects in a manner set forth in the following specification as illustrated in the accompanying drawing, in which:

Fig. 1 is a plan of a preferred form of the device showing a plurality of openings.

Fig. 2 is a section taken along the line 2—2 in Fig. 1.

Fig. 3 is a plan of a modified form of the device, showing the manner of reenforcing the holes and the employment of colored concave surfaces.

Fig. 4 is a section taken along the line 4—4 in Fig. 3.

Similar numbers of reference refer to the same or similar parts throughout the several views.

In the form shown in Figs. 1 to 4 inclusive, there is an intermediate flat portion 19, and a pair of reversely curved ends 20 and 21, having depressions 22 and 23 formed in opposite sides thereof. The end 21 thereof, having a plurality of holes 24, formed therein, while the end 20, has a hole 25, formed therein.

With this form of the device, the type of action produced, may be selectively controlled by the operator merely by the choice of the hole 24, in which a ring 14, is inserted.

In the form of the device shown in Fig. 3, the member 26, is provided with somewhat pear-shaped lobes 27 and 28, the concave sides of which are covered with a coating of paint 29, or other finish which may be applied to either or both of the lobes 27 and 28.

In this form of the device, there is shown an eyelet 30, which is set within each of the holes 24, or 25, to reenforce the edges thereof and protect the edges against wear from the rings 14.

This construction is clearly shown in Fig. 4.

We are aware that many forms of spinners and lures have been constructed in the past and it is therefore, not our intention to cover such devices broadly. We do, however, intend to cover such forms and modifications thereof as fall fairly within the appended claims.

We claim:

1. A lure of the class described, consisting of a member, S-shaped in plan, having the intermediate portion thereof flat, and having the ends thereof oppositely curved, characterized by having the adjacent ends of said curved portions overlapping along the middle of the length of said S-shaped member.

2. A lure consisting of a body, S-shaped in plan, having a flattened portion extending diagonally across the length thereof, between its ends, the end portions of said lure being somewhat pear-shaped and curved from opposite sides thereof, said lure having perforated ends, two of which perforations are transversely offset.

WILSON C. HUNTLEY.
KENNETH S. WRIGHT.

REFERENCES CITED

The following references are of record in the file of this patent:

UNITED STATES PATENTS

| Number | Name | Date |
|---|---|---|
| 1,179,964 | Robertson | Apr. 18, 1916 |